Figure 1:
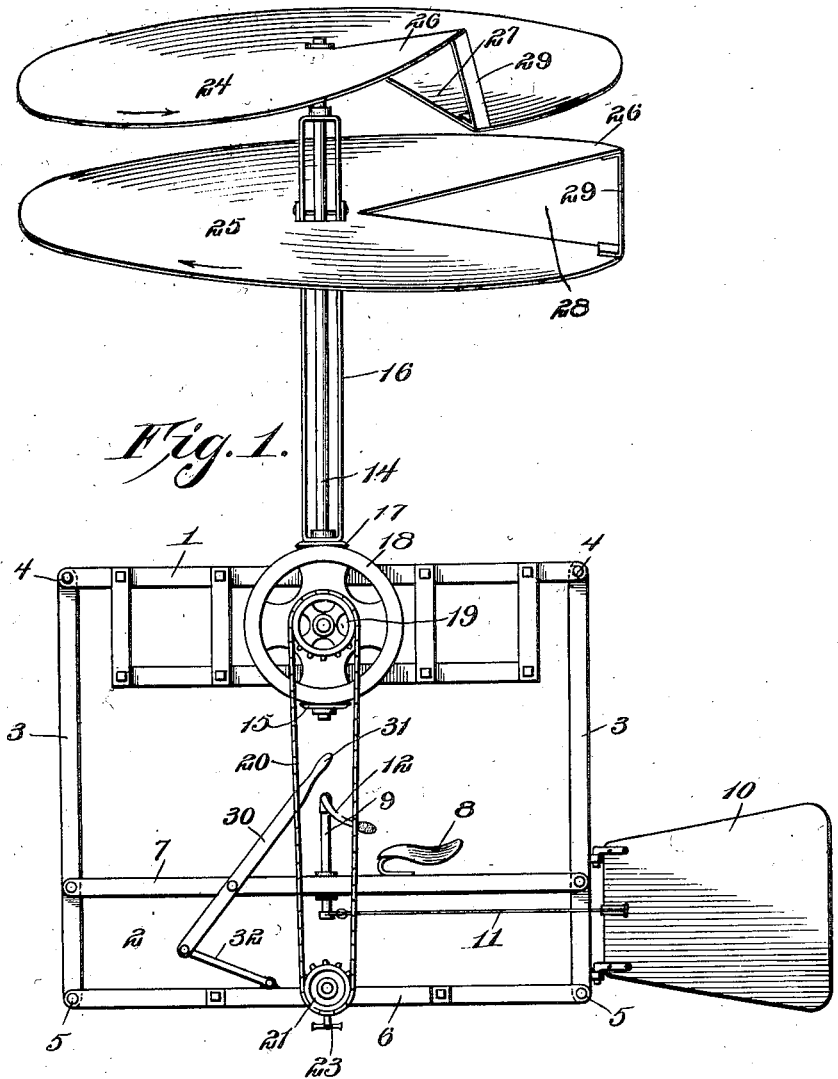

No. 897,738. PATENTED SEPT. 1, 1908.
W. GORDON.
FLYING MACHINE.
APPLICATION FILED APR. 28, 1906.

2 SHEETS—SHEET 1.

Inventor
W. Gordon

Witnesses
Louis R. Heinrichs
C. C. Hines

By Victor J. Evans
Attorney

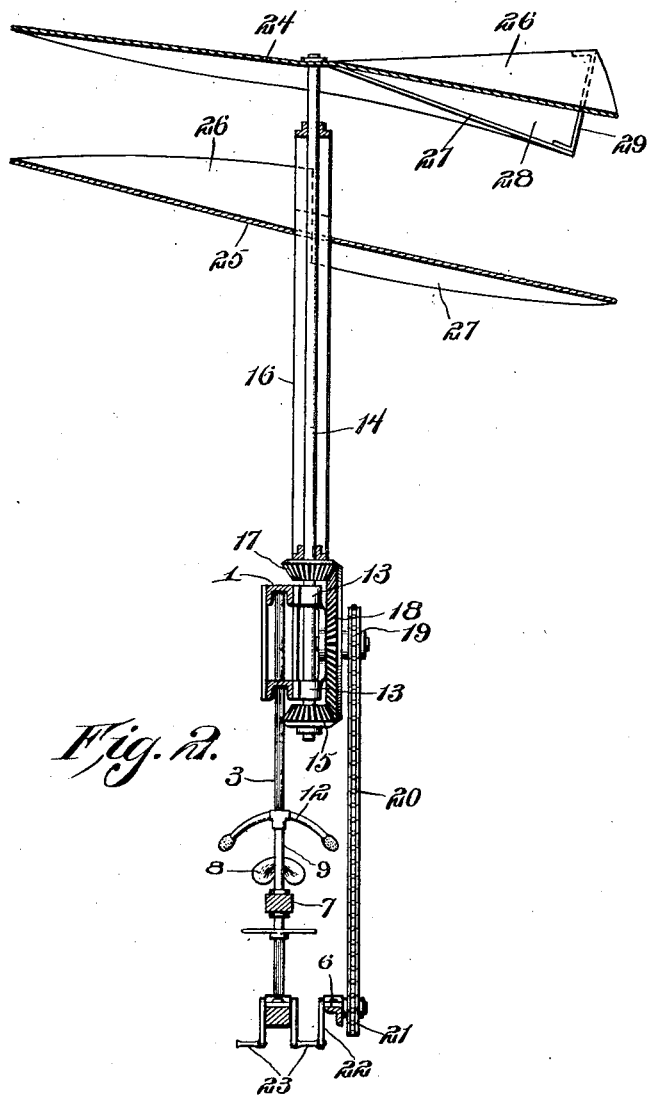

UNITED STATES PATENT OFFICE.

WINNE GORDON, OF SHARON SPRINGS, NEW YORK, ASSIGNOR OF ONE-HALF TO WORTHIE E COLYER, OF ARGUSVILLE, NEW YORK.

FLYING-MACHINE.

No. 897,738.               Specification of Letters Patent.           Patented Sept. 1, 1908.

Application filed April 28, 1906. Serial No. 314,176.

*To all whom it may concern:*

Be it known that I, WINNE GORDON, a citizen of the United States of America, residing at Sharon Springs, in the county of Schoharie and State of New York, have invented new and useful Improvements in Flying - Machines, of which the following is a specification.

This invention relates to improvements in flying machines, and has for its object to provide a machine of this character of simple construction and adapted to be conveniently controlled by the aeronaut.

In the accompanying drawings,—Figure 1 is a side elevation of a flying machine embodying my invention. Fig. 2 is a vertical transverse section of the same.

Referring to the drawings, 1 designates the main frame of the machine, from which is supported a car or supplemental frame 2, said supplemental frame comprising hanger bars 3 pivoted at their upper ends to the frame 1, as indicated at 4, and pivotally connected at their lower ends, as at 5, by a bottom bar 6. Above the bars 6 the bars 3 are connected by a link bar 7 which supports an operator's seat 8 and a steering post 9. The frame 2 carries a pivoted, laterally swinging rudder vane 10 mounted upon the lower end of the rear hanger bar 3 and attached to the lower end of the steering post 9 by suitable connections 11. The post 9 is provided with an operating handle or lever 12 disposed adjacent the seat 8, and is suitably journaled in the link bar 7.

The main frame 1 carries bearings 13 in which is journaled a shaft 14 extending upwardly therefrom and carrying at its lower end a pinion 15. Arranged to rotate upon the shaft 14 is a second shaft 16, which may be hollow or of the open-frame type shown and terminates at its upper end below the upper end of the shaft 14, and is provided at its lower end with a pinion 17. The pinions 15 and 17 mesh with a drive gear 18 journaled on the frame 1, and to the shaft of said gear is keyed or otherwise fixed a sprocket wheel 19. This wheel 19 is connected by a drive chain 20 with a sprocket wheel 21 on a main driving shaft 22 journaled in the bottom bar 6 of the frame 2. Pedal cranks 23 are provided on the shaft 22 to enable said shaft to be driven by the operator occupying the seat 8.

The construction and arrangement of the main driving mechanism is substantially that employed upon bicycles or similar vehicles, but motor drive mechanism of any preferred type may be used in lieu thereof.

Rigidly mounted upon the upper ends of the shafts 14 and 16 are propelling aeroplanes 24 and 25, each comprising a substantially circular disk formed of some suitable strong, durable and light material. These disks are similar in construction, and each is radially slitted at one point and has the free edges of its slitted portion bent or curved upwardly and downwardly, respectively, to provide wings 26 and 27 and an intervening slot or passage 28, the free ends of the wings being connected by a brace or connecting piece 29. The edges of the wings 26 and 27 lap slightly in overlying relation, and said wings are shown bent or curved so as to form vanes to act upon the air to secure a lifting motion, the slot 28 providing a passage to permit of the circulation of air between said vanes to prevent interference with the free motion of the aeroplanes. The vanes of the two disks are arranged at different points in their respective paths of revolution and project respectively in opposite directions so as to properly act upon the air according to their directions of rotation.

Through the action of the gearing the aeroplanes are rotated in opposite directions, and in their operation the torsional or tendency to turning effect produced by each is counteracted by the other, so that they will conjointly operate to lift the machine. When the shafts stand vertically and the aeroplanes are horizontally disposed, rotation of said vanes will cause them to act upon the air in such manner as to propel the machine directly upward, and to secure a suspending and forward propelling action the vanes are forwardly inclined to a greater or less extent, the speed of forward projection of the machine being dependent upon the extent of inclination of the planes and their speed of rotation.

In order to tilt or incline the aeroplanes means are provided to effect this by shifting the center of gravity of the machine. To this end a shifting lever 30 is pivoted to the link bar 7 and provided at one end with a handle 31 disposed in convenient juxtaposition to the operator's seat. The other end of the lever is connected by a link 32 with the bottom bar 6. By throwing this lever backwardly, the links 6 and 7 will be moved in opposite directions and the frame 2 shifted forwardly so as to throw the weight of the operator and gearing in front of the center of gravity of the machine. Hence the frame as a whole will be caused to tilt downwardly and forwardly to a greater or less extent or angle according to the extent of movement of the lever 30, whereby the aeroplanes are caused to dip or assume an angular position, so that they will act upon the air in such manner as to impart a forward movement to the machine, the latter being steered or guided by means of the rudder vane 10. By shifting the weight of the operator to a greater or less extent in front of the center of gravity, thus varying the inclination of the aeroplanes, the machine will be propelled forward with a greater or less speed, dependent upon the degree of inclination and their rapidity of rotation. A reverse motion of the lever will restore the parts to normal position, in which the aeroplanes will rotate in a horizontal plane and immediately above the center line of the machine, whereby they will operate to lift and suspend the machine in the air. By simply bringing the aeroplanes back to normal position in the manner described and progressively decreasing the speed of rotation thereof, the operator may cause the machine to descend at any desired rate of speed. Locking means of any preferred character may be employed to hold the lever 30 in fixed relation to the link bar 7.

Having thus described the invention, what is claimed as new, is:—

1. A flying machine comprising a main frame, oppositely rotating propellers carried thereby, a supplemental frame suspended from the main frame, said supplemental frame comprising hangers pivotally connected with the main frame, a bottom bar pivotally connected with the hangers, and a link joining the hangers above the bottom bar, drive gearing supported by the main and supplemental frames for driving the propellers, and adjusting means connected with the bottom bar and link of the supplemental frame for shifting the portions of said frame to change the center of gravity of the machine.

2. A flying machine embodying a main frame, propellers carried thereby, a supplemental frame suspended from the main frame, said supplemental frame comprising hangers pivotally connected with the main frame, a bottom bar pivotally connected with the hangers, and a link joining the hangers above the bottom bar, drive gearing supported by the main and supplemental frames for operating the propellers, and adjusting means associated with two of the aforesaid portions of the supplemental frame for shifting said frame to change the center of gravity of the machine.

In testimony whereof, I affix my signature in presence of two witnesses.

WINNE GORDON.

Witnesses:
 CHESTER BURIMEYER,
 CARLOS PEFT.